United States Patent

Oberst

[15] 3,693,099

[45] Sept. 19, 1972

[54] DEAD ZONE PHASE DETECTOR

[72] Inventor: James Francis Oberst, Howell Twp., Monmouth County, N.J.

[73] Assignee: Bell Telephone Laboratories, Incorporated, Murray Hill, N.J.

[22] Filed: June 29, 1971

[21] Appl. No.: 157,960

[52] U.S. Cl. ....................328/134, 328/109, 328/110

[51] Int. Cl. ..............................................H03b 3/12

[58] Field of Search.......328/111, 112, 134, 109, 110

[56] References Cited

UNITED STATES PATENTS

| | | | |
|---|---|---|---|
| 3,532,994 | 10/1970 | Ferrier | 328/134 X |
| 3,564,285 | 2/1971 | Gilbert | 328/112 X |
| 3,573,493 | 4/1971 | Kamin | 328/112 |
| 3,592,961 | 7/1971 | Grace | 328/134 |

*Primary Examiner*—John S. Heyman

*Attorney*—R. J. Guenther and E. W. Adams, Jr.

[57] ABSTRACT

A phase detector is arranged so as to have a dead zone in its transfer characteristic in the region near zero phase error. The dead zone is achieved with various delay elements arranged so as to block the phase detector output when the reference and test signals are nearly synchronized. At other times positive or negative pulses are generated, depending on whether there is a leading or lagging phase error. These pulses are combined in a summing amplifier to produce the phase detector output.

6 Claims, 9 Drawing Figures

INVENTOR
J. F. OBERST
BY
[signature]
ATTORNEY

DEAD ZONE PHASE DETECTOR

BACKGROUND OF THE INVENTION

This invention relates to phase detectors and, more particularly, to phase detectors which have a dead zone in their transfer characteristic in the region of zero phase error.

Phase detectors are generally used in phase control or phase-locked loops to synchronize a local oscillator to an incoming signal. The two signals are compared in the phase detector and the resulting output is used to vary the frequency of the local oscillator. These circuits require that the local oscillator frequency be close to that of the input signal. If it is not, it is possible for the local oscillator to lock to a harmonic of the input signal or not to lock at all. One way of preventing this is to provide a frequency detector which prevents the circuit from locking until the frequencies of the local oscillator and the input signal are nearly the same. However, as disclosed in the copending application of M. R. Aaron-W G. Hammett-J. F. Oberst, (Case 13-1-1), Ser. No. 157,961, filed June 29, 1971, a phase detector can be substituted for the frequency detector. In either situation it is usually necessary to eliminate the output of the frequency detector or the second phase detector when the frequencies are nearly equal, so that they will not affect the final phase lock.

In another application, the output of a dead band phase detector can also be used as the signal to change the operational mode of a phase-locking or detecting system.

It is, therefore, an object of this invention to provide a circuit to be used in phase-locked loops which provides frequency synchronization and system mode changing information.

SUMMARY OF THE INVENTION

The present invention is directed to expanding the usefulness of a phase-locking or detecting system by providing a phase detector with a dead zone in its transfer characteristic in the region near zero phase error. This allows the system to have dual mode operation, depending on the amplitude of the phase error.

A simple dead zone phase detection is created when a bipolar diode threshold circuit is connected to the output of a conventional phase detector. The threshold circuit blocks the output of the phase detector until it has reached a magnitude greater than the diode forward voltage. Therefore, error signals less than 0.7 volt appear as a zero level at the output.

In an illustrative embodiment of the invention, a reference oscillator output is connected to a multiple output pulse-spacing circuit. When the reference oscillator frequency is much higher than the input signal this circuit is a digital counter circuit connected to a decoder. The multiple outputs are the outputs of the decoder when the counter has reached preselected numbers. When the reference and input signals have the same frequency, the pulse-spacing circuit is a tapped delay line. Each output or tap of the pulse-spacing circuit generates a pulse in response to the reference signal which is successively later in time than the previous one. The first output of the pulse-spacing circuit is applied to the SET input of a first flip-flop and the RESET input of a second flip-flop. The second output of the pulse-spacing circuit is connected to the RESET input of the first flip-flop and the third output is connected to the SET input of the second flip-flop. With this arrangement the output of the first flip-flop is high from the time a pulse appears at the first output of the pulse-spacing circuit until a pulse appears at the second output. The second flip-flop is high from the time a pulse appears at the third output of the pulse-spacing circuit until a new pulse appears at the first output. Since the first flip-flop is turned OFF before the second one can be turned ON there exists a period when neither flip-flop is ON. The outputs of these two flip-flops are connected to first and second AND gates, respectively. Also, the input signal is applied to both of these AND gates. When an input signal occurs while the first flip-flop has a high level, a pulse is sent to a first monostable multivibrator. When the input signal occurs while the second flip-flop is high, a pulse is sent to a second monostable multivibrator. However, if the input signal occurs while neither flip-flop has a high level there is no pulse sent to either multivibrator and a dead zone in the transfer characteristic is generated. The first multivibrator generates negative pulses and the second multivibrator generates positive pulses. The outputs of these multivibrators are combined in a summing amplifier to produce the detector output.

In another illustrative embodiment of the invention, reference and input signals are applied through equal time delay elements to the SET inputs of first and second flip-flops, respectively. The outputs of these two flip-flops are connected to an AND gate whose output is applied to the RESET inputs of both flip-flops through a second delay element. When the phase relationship is such that the reference signal occurs first, the first flip-flip develops a high output. On the occurrence of the input signal, the second flip-flop develops a high output. Then both flip-flops reset after a time equal to the second delay element. Therefore, the output of the first flip-flop has a duration equal to the sum of the time difference between the two signals and the time of the second delay element.

Two monostable multivibrators are connected to both input signals, respectively. The outputs of these multivibrators are connected to INHIBIT terminals of a first and second INHIBIT gate, respectively. Also, the outputs of the first and second flip-flops are connected to the signal terminals of the first and second INHIBIT gates, respectively. The multivibrators are adjusted to produce a pulse which has a width equivalent to the sum of the times of the first and second delay elements plus a fixed delay, T. By connecting the outputs of the first and second INHIBIT gates to the PLUS and MINUS inputs of a summing amplifier, respectively, the circuit output is generated. With this arrangement a leading reference signal produces an output from the first INHIBIT gate provided that it leads the test signal by more than time, T. This produces a positive output pulse from the amplifier whose width is equal to the difference between the lead time and T. These pulses are then integrated in a low-pass filter. When the test signal leads the reference signal, the second INHIBIT gates has an output provided that it leads by more than T. This causes a negative output from the amplifier. However, when neither signal leads by more than T, there is no output from the circuit.

The foregoing and other features of the present invention will be more readily apparent from he following detailed description and drawings.

DETAILED DESCRIPTION

Figure 1:
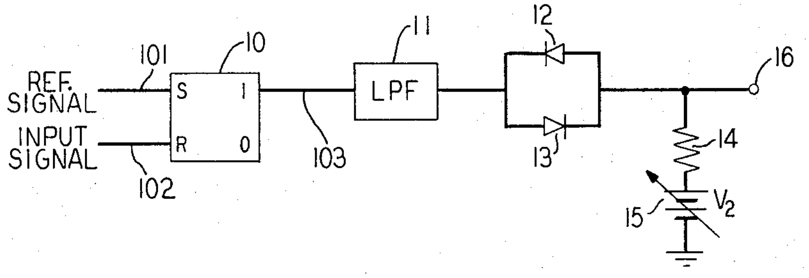
FIG. 1 is a schematic of a simple dead zone phase detector.

FIG. 1 is a schematic of a simple type of dead band phase detector. The reference signal is applied to SET input 101 of flip-flop 10 and the input signal is applied to RESET input 102 of flip-flop 10. In a phase-locked loop the reference signal would be the output of the local oscillator and the input signal would be the synchronizing input. Output 103 of flip-flop 10 is applied to low-pass filter 11, which has its output connected to the cathode of diode 12 and the anode of diode 13. The anode of diode 12 and the cathode of diode 13 are connected to output terminal 16. Also, resistance 14 is connected between output terminal 16 and the PLUS side of voltage supply 15. The negative side of voltage supply 15 is connected to ground.

Figure 2:
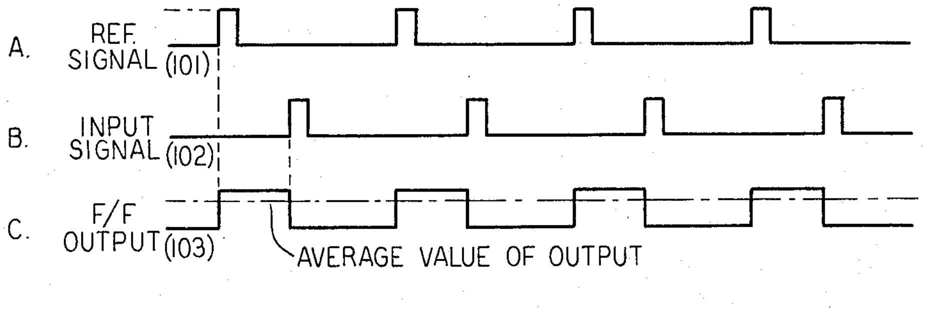
FIG. 2 is a timing diagram for the circuit of FIG. 1.
Figure 3:
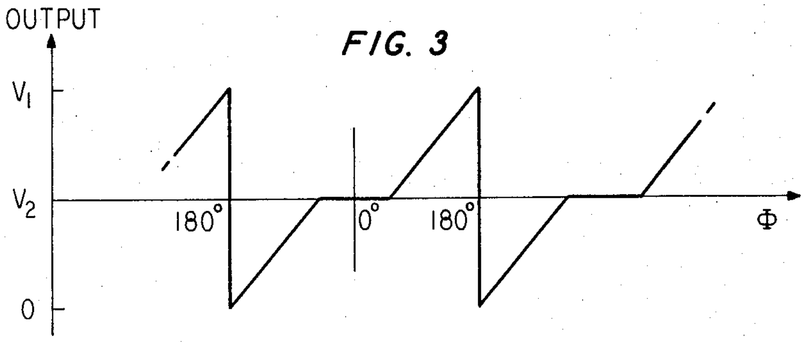
FIG. 3 is a transfer function for the circuit of FIG. 1.

FIG. 2 shows that the reference signal turns flip-flop 10 ON and the input signal turns it OFF. The output signal from the flip-flop is then integrated in low-pass filter 14, generating an output which is proportional to the average value of the output of flip-flop 10. However, the diodes of the threshold circuit block the output from the low-pass filter when it close to the setting of voltage supply 15. This produces a transfer function like that shown in FIG. 3. When this type of circuit is included in a phase-locked loop, the phase lock occurs when the test signal and reference signal have a particular phase relationship to each other. This phase relationship depends on the setting of voltage supply 15. A disadvantage of this circuit is that the gain becomes non-linear as the dead zone is approached because of the diode characteristics. Also, the extent of the dead zone is temperature dependent and can only be adjusted in increments equal to the diode forward voltage. However, the major disadvantage is that a low-pass filter, which could cause the phase-locked loop to become underdamped, is required before the phase detector output.

Figure 4:
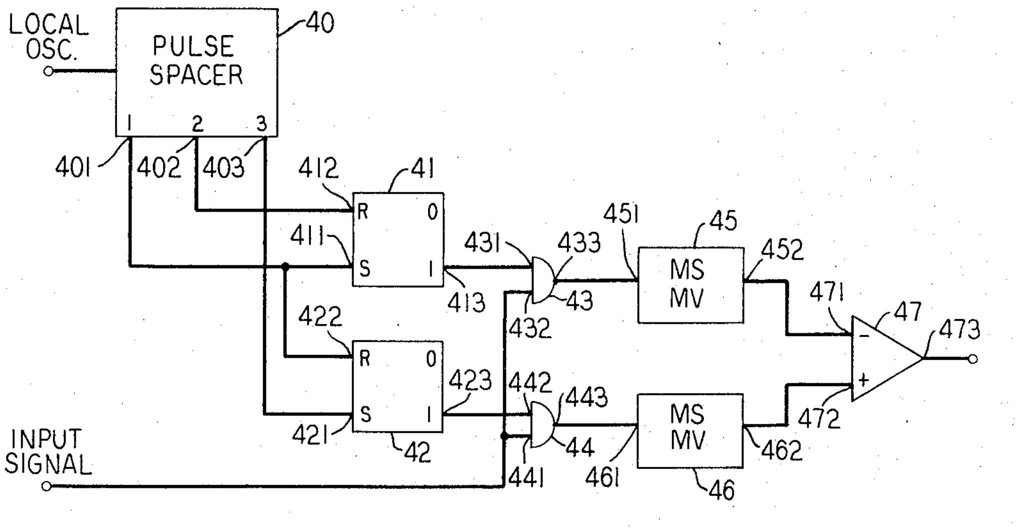
FIG. 4 is a schematic of an illustrative embodiment of the invention.

FIG. 4 is a schematic of a dead band phase detector circuit which overcomes these disadvantages. In FIG. 4 the reference signal is applied to a pulse-spacing circuit 40 which has three outputs. Each output generates a pulse in response to the reference signal pulse, which is successively later in time than the previous output. In a particular embodiment where the reference and the test signals are synchronized, the period of time between the occurrence of a pulse at the first output and the occurrence of a pulse at the second, is nearly equal to the time between the occurrence of a pulse at the third output and the occurrence of a new pulse at the first. The first output, 401, of pulse-spacing circuit 40 is applied to SET input 411 of flip-flop 41 and RESET input 422 of flip-flop 42. The second output, 402, of pulse-spacing circuit 40 is applied to RESET input 412 of flip-flop 41 and the third output, 403, of pulse-spacing circuit 40 is applied to SET input 421 of flip-flop 42. The pulse-spacing circuit can be a simple tapped delay line when the frequency of the input and reference signals are nearly the same. However, if the reference signal occurs at a frequency much higher than the input signal, the pulse spacer can be a frequency divider or digital counter circuit with decoders connected to its outputs. For example, the divider network could be a decade divider. Then the decoder would be arranged to generate a pulse at the first output on the count of one, at the second output at the count of five, and the third output at the count of seven. With this arrangement, flip-flop 41 will have a high level while the circuit counts the reference signal pulses from one to five. Between the counts of five and seven neither flip-flop will be high. However, between the count of seven and a new one count, flip-flop 42 will be high.

Output 413 of flip-flop 41 is applied to input 431 of two-input AND gate 43. In addition, output 423 of flip-flop 42 is applied to input 442 of two-input AND gate 44. The input signal is applied to input 432 of AND gate 43 and input 411 of AND gate 44. When the test signal occurs while flip-flop 41 is high, a pulse is supplied from output 433 of AND gate 43 to input 451 of monostable multivibrator 45. However, when the input signal occurs while flip-flop 42 is high, a pulse is supplied from output 443 of AND gate 44 to input 461 of monostable multivibrator 46. Output 452 of multivibrator 45 is connected to inverting input 471 of amplifier 47 and output 462 of multivibrator 46 is connected to noninverting input 472 of amplifier 47. The output of the circuit is taken from output 473 of amplifier 47. The multivibrators are used to stretch the pulse outputs of the AND gates and may be any of the circuits disclosed in the prior art for this purpose.

Figure 5:
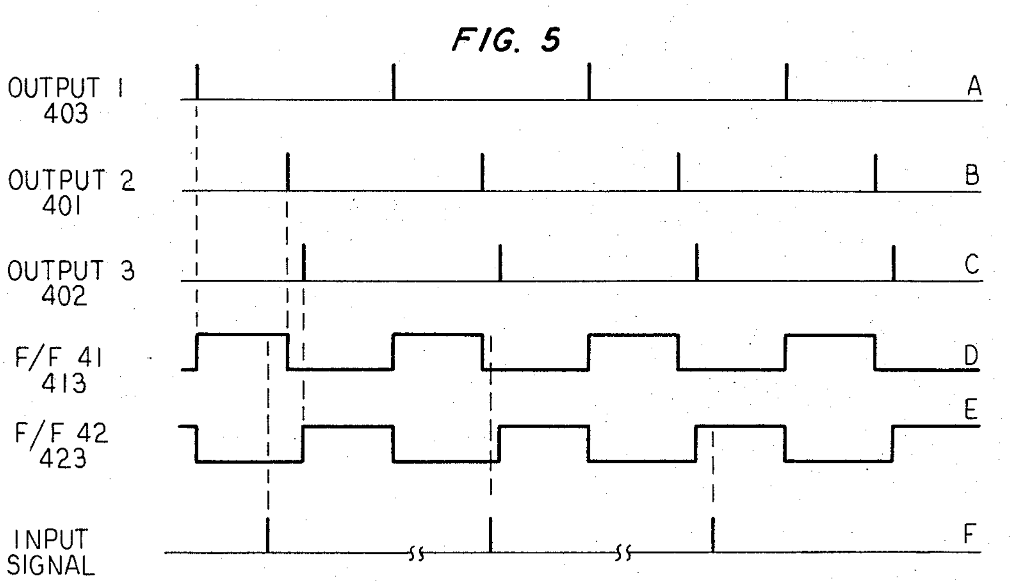
FIG. 5 is a timing diagram for the circuit of FIG. 4.
Figure 6:
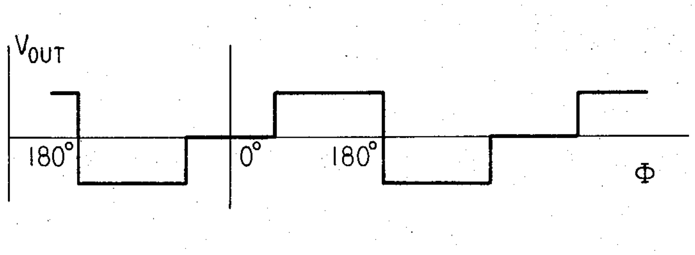
FIG. 6 is the transfer function for the circuit of FIG. 4.

Curves A, B and C of FIG. 5 show the outputs from the pulse-spacing circuit 40; curve D of FIG. 5 is the output of flip-flop 41; and curve E is the output of flip-flop 42. Curve F of FIG. 5 shows the possible phase relationships of a test signal to the other outputs of the circuit. When the test signal occurs while flip-flop 41 is high, multivibrator 45 causes a negative pulse to occur at the output 473 of amplifier 47. When the test pulse occurs in the dead zone there is no output from the circuit. However, when the pulse occurs while flip-flop 42 is high, multivibrator 46 causes a positive pulse to appear at the circuit output. This circuit arrangement produces the square transfer function shown in FIG. 6 and eliminates the gain change due to the diode characteristic at the edges of the dead zone mentioned previously. It also has good temperature stability, since it does not depend on the forward voltage of a diode. However, the major advantage is that there is no need for a low-pass filter, which could cause underdamping in a phase-locked loop. Another advantage is the fact that the dead zone can be adjusted by a change in the time delay between the second and third outputs of the pulse-spacing circuit to any percentage of the input signal period. This embodiment of the invention is particularly useful in phase-locked loops in which the local oscillator runs at a higher frequency than the input signal. Also, the square wave form causes rapid pull-in. However, the lack of any linear region in this phase detector characteristic may cause poor performance after lock up is achieved.

Figure 7:
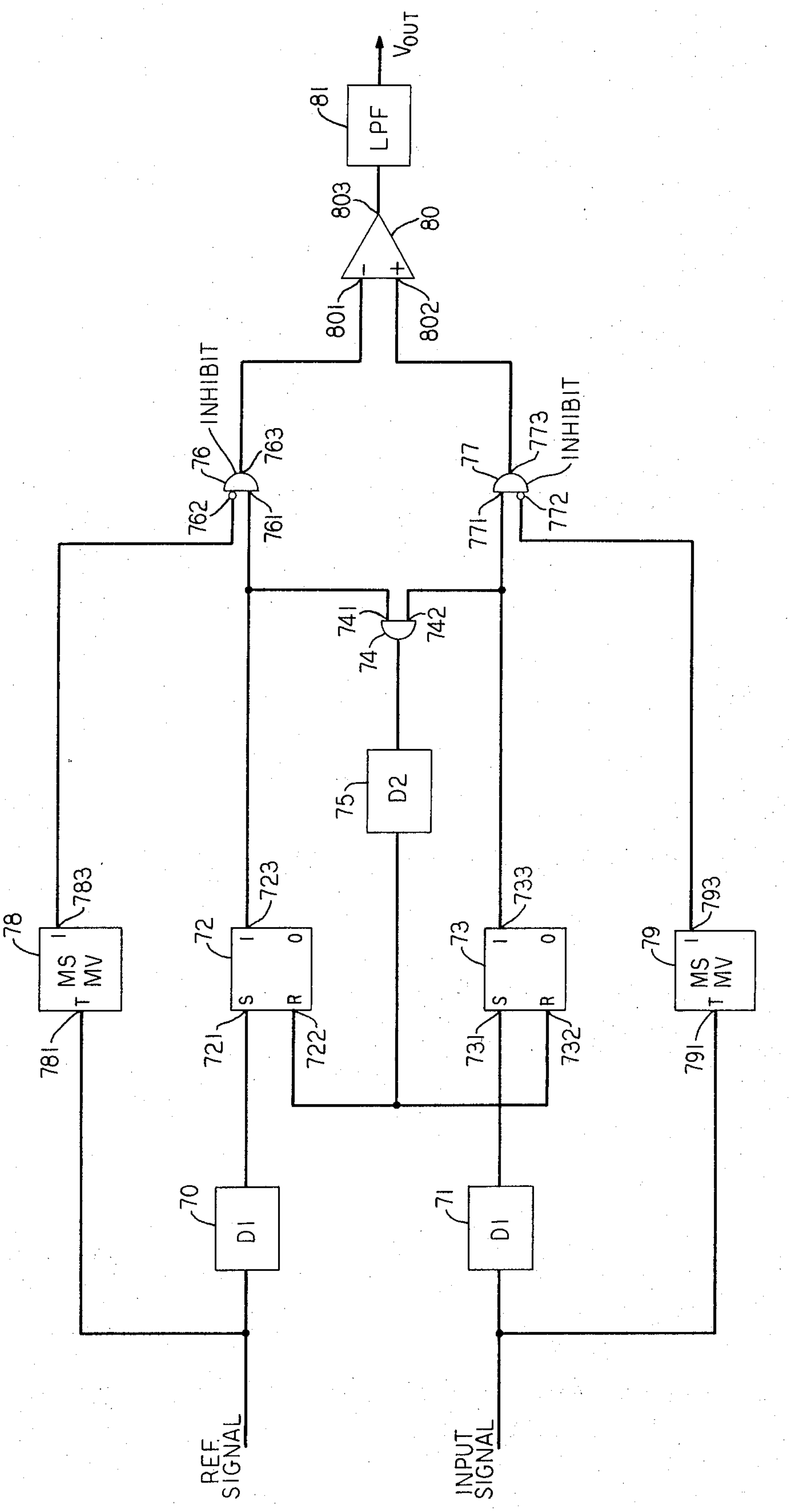
FIG. 7 is a schematic of another illustrative embodiment of the invention.

The circuit of FIG. 7 is a dead zone phase detector which has linearity after pull-in. In the circuit of FIG. 7, the reference signal is applied to delay element 70 and input 781 of monostable multivibrator 78. The input signal is applied to delay element 71 and input 791 of monostable multivibrator 79. Delay elements 70 and 71 both provide a time delay, $D_1$. The output of delay element 70 is connected to the SET input 721 of flip-flop 72 and the output of delay element 71 is connected to SET input 731 of flip-flop 73. Output 723 of flip-flop 72 is connected to input 741 of AND gate 74 and input 761 of INHIBIT gate 76. Output 733 of flip-flop 73 is connected to input 742 of AND gate 74 and input 771 of INHIBIT gate 77. Delay element 75 is connected between the output of AND gate 74 and the RESET inputs 722 and 732 of flip-flops 72 and 73, respectively. Delay element 75 provides a time delay, $D_2$.

When a phase relationship exists so that the reference signal occurs before the input signal, flip-flop 72 has a high output at a time $D_1$ after the occurrence of a reference signal pulse. When the input signal occurs, flip-flop 73 has a high output at a time $D_1$ after the occurrence of the input signal. Since the outputs of both the flip-flops are combined in AND gate 74 and used to reset the flip-flops, both their outputs go low at a time $D_2$ after flip-flop 73 goes high. Therefore, the output of flip-flop 72 will be high for a period equal to the time delay between the two signals plus the time $D_2$.

Output 783 of multivibrator 78 is connected to INHIBIT input 762 of INHIBIT gate 76. In addition, output 793 of multivibrator 79 is connected to INHIBIT input 772 of INHIBIT gate 77. Both multivibrators are adjusted to have an output pulse whose width is equal to the sum of $D_1$, $D_2$, and a period, T. Therefore, when the reference signal leads the input signal, INHIBIT gate 76 has an output, provided that the phase lead is greater than T. However, when the input signal leads the reference signal, INHIBIT gate 77 has an output, provided the phase lead is greater than T. In the case when neither signal has a phase lead greater than T, the INHIBIT signal prevents either INHIBIT gate from having an output.

Output 763 of INHIBIT gate 76 is connected to inverting terminal 801 of amplifier 80 and output 773 of INHIBIT gate 77 is connected to noninverting input 802 of amplifier 80. The output, 803, of amplifier 80 is passed through low-pass filter 81 to the circuit output. Unlike the narrow band low-pass filter of FIG. 1, filter 81 can have a band width that is so wide that it doesn't effect the loop performance. Often the filtering action of the phase-locked loop itself provides the smoothing achieved by this filter.

Figure 8:
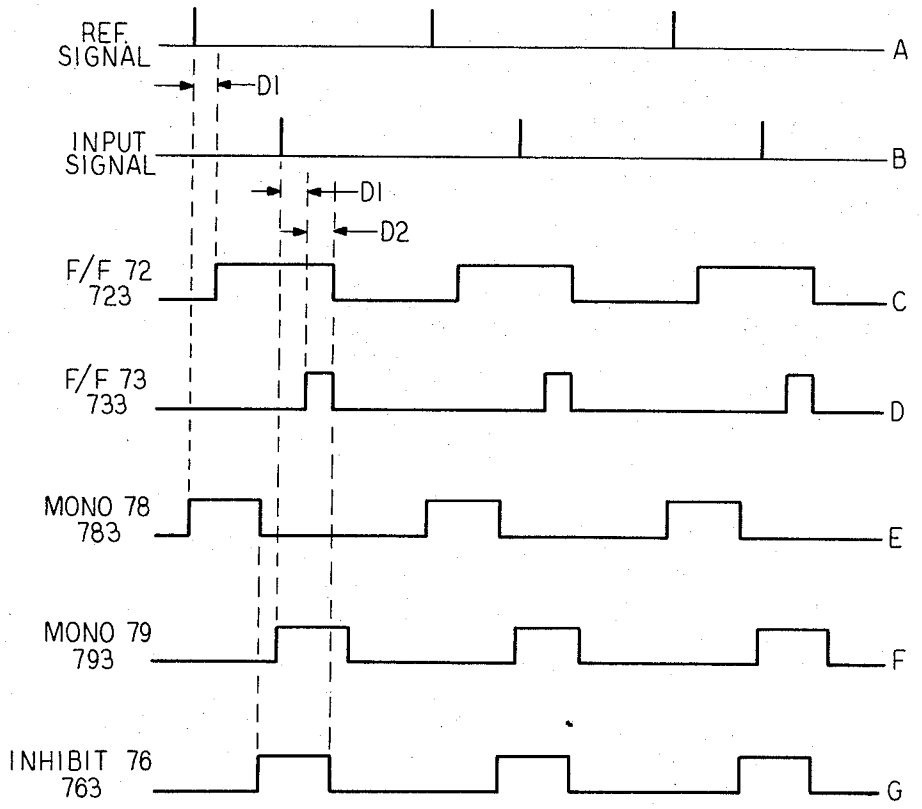
FIG. 8 is a timing diagram for the circuit of FIG. 7.
Figure 9:
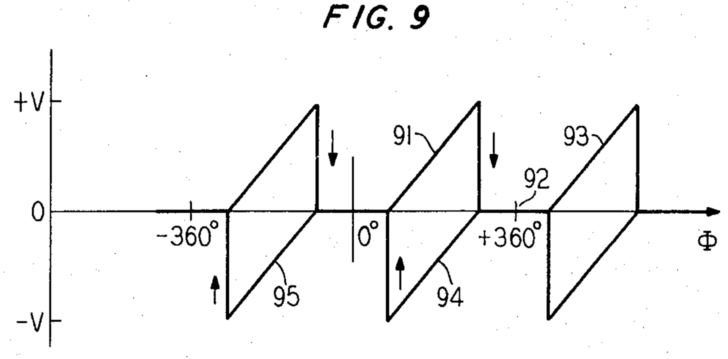
FIG. 9 is the transfer function for the circuit of FIG. 7.

Curves A and B of FIG. 8 show the reference and input signals, respectively. Curves C and D represent the outputs of flip-flops 72 and 73, respectively, for a condition when the reference signal leads the input signal. Curves E and F of FIG. 8 show the outputs of multivibrators 78 and 79, respectively. A comparison of curves D and F shows that under these circumstances there is no output from INHIBIT gate 77. However, curve G of FIG. 8 shows that there is an output from INHIBIT gate 76. As the phase difference between the reference and input signals increases, the width of the pulse in curve G gets larger. This causes an increasing positive output as indicated by line segment 91 of the circuit transfer function shown in FIG. 9. The output will continue to increase in the range $0 < \Phi < 360$ until the signals are close enough to enter the dead zone represented by line segment 92. When the phase difference exceeds 360°, flip-flop 72 will continue to set first and the output will again increase positively as shown by line segment 93 in FIG. 9. However, if the phase difference is decreasing, the width of the pulse in curve G gets smaller until the phase difference is small enough for the circuit to be operating in the dead zone. If the phase difference continues to decrease, a point is reached where the input signal leads the reference signal and the circuit changes states. In the new state, INHIBIT gate 77 has an output similar to curve G and there is no output from INHIBIT gate 76. This causes the negatively increasing line segments 94 or 95 in FIG. 9. Thus, the transfer function has a two valued characteristic. The curve on which the circuit is operating depends on whether the phase difference was increasing or decreasing as the operation passed through the dead zone. This allows only one-way transitions at the discontinuities as indicated by the arrows in FIG. 9. This two valued characteristic increases the pull-in range over that achieved by a comparable phase locked loop employing a standard saw-tooth phase detector. In addition, the pull-in time is decreased because an increasing phase difference in this circuit produces only positive voltages (negative for decreasing phase differences) while the standard phase detector produces an alternating signal.

Delay elements 70 and 71 of the circuit are included to assure that the INHIBIT signal gets to either INHIBIT gate 76 or INHIBIT gate 77 before the output of the flip-flops. Delay element 75 is used to assure stability of the internal loop. One advantage of this circuit is the fact that the size of the dead zone can be adjusted by adjusting the pulse widths of the multivibrator outputs. This circuit also has a linear characteristic after pull-in and does not require an internal low pass filter. In addition, it does not suffer from nonlinear gain changes at the edge of the dead zone. Further, it increases the pull-in range and decreases the pull-in time when used in a phase-locked loop.

While the invention has been particularly shown and described with reference to preferred embodiments thereof, it will be understood by those skilled in the art that various changes in form and details may be made therein without departing from the spirit and scope of the invention.

What is claimed is:

1. A phase detector circuit with a dead zone in its transfer characteristic for comparing the phase of an input signal to that of a reference signal and producing a signal at its output which is related to the comparison, comprising:

a first means for comparing the reference signal and the input signal, and producing output signals related to the phase difference between the compared signals, said first means comprising means for selecting a portion of the period of the compared signals and means for generating a control signal when one of the compared signals occurs during the selected portion of the other;

a second means responsive to the control signal of said first means for inhibiting the output signals of said first means when one of the compared signals occurs in the selected portion of the other; and a third means for combining the output signals of said first means and producing the circuit output signal, said circuit output signal being indicative of the phase difference between the input and reference signals when the difference is greater than a predetermined minimum and zero when the difference is less than the predetermined minimum.

2. A phase detector circuit with a dead zone in its transfer characteristic for comparing the phase of an input signal at its first input terminal to that of a reference signal at its second input terminal and producing an output signal at its output terminal which is related to the comparison, comprising:

a pulse spacing means for generating first, second and third repetitive output signals at first, second, and third output terminals, respectively, in response to the reference signal, the first signal leading the second in time by a first predetermined amount and the second signal leading the third in time by a second predetermine amount;

a first bistable multivibrator having its SET input connected to the first output terminal of said pulse spacing means and its RESET input connected to the second output terminal of said pulse spacing means;

a second bistable multivibrator having its SET input connected to the third output terminal of said pulse spacing means and its RESET input connected to the first output terminal of said pulse spacing means;

a first two-input AND gate having its first input connected to the output of said first bistable multivibrator and its second input connected to the first input terminal of the circuit;

a second two-input AND gate having its first input connected to the output of said second bistable multivibrator and its second input connected to the first input terminal of the circuit;

a first pulse stretching means for generating a pulse at its output which is wider than the pulse at its input, said pulse stretching means having its input connected to the output of said first AND gate;

a second pulse stretching means for generating a pulse at its output which is wider than the pulse at its input, said pulse stretching means having its input connected to the output of said second AND gate; and an amplifier with inverting and noninverting inputs having its inverting input connected to the output of said first pulse stretching means, its noninverting input connected to the output of said second pulse stretching means, and its output connected to the circuit output.

3. A circuit as claimed in claim 2 wherein said pulse spacing means is a delay line with three output taps, each tap corresponding to a greater time delay from the input than the preceding tap.

4. A circuit as claimed in claim 2 wherein the reference signal has a significantly higher frequency than the test signal and the pulse spacing means comprises:

a multiple output counter circuit whose outputs indicate the number of pulses applied to its input since the last time it was reset;

a first decoder circuit responsive to the outputs of said counter circuit for resetting the counter at such a rate that one of its outputs is at a frequency substantially the same as the detector circuit input signal;

a second decoder circuit responsive to the output of said counter circuit for producing an output when the outputs of said counter circuit indicate that a first preselected number of pulses have been applied to said counter circuit's input;

a third decoder circuit responsive to the outputs of said counter circuit for producing an output when the outputs of said counter circuit indicate that a second preselected number of pulses have been applied to said counter circuit's input, the second preselected number being larger than the first; and a fourth decoder circuit responsive to the outputs of said counter circuit for producing an output when the outputs of said counter circuit indicate that a third preselected number of pulses have been applied to said counter circuit's input, the third preselected number being larger than the second.

5. A circuit as claimed in claim 2 wherein said first and second pulse stretching means are monostable multivibrators arranged to have output pulses that are wider than the pulses of the detector circuit input signal.

6. A phase detector circuit with a dead zone in its transfer characteristic for comparing the phase of an input signal at its first input terminal to that of a reference signal at its second input terminal and producing an output signal at its output terminal which is related to the comparison, comprising:

a first delaying means, having the second input terminal of the circuit connected to its input, for producing the reference signal delayed by a first time period at its output;

a second delaying means having the first input terminal of the circuit connected to its input, for producing the input signal delayed by the first time period at its output;

a first bistable multivibrator having its SET input connected to the output of said first delaying means;

a second bistable multivibrator having its SET input connected to the output of said second delaying means;

a two-input AND gate having the outputs of said first and second bistable multivibrators connected to its first and second inputs, respectively;

a third delaying means, for delaying signals applied to it by a second time period, connected between the output of said AND gate and the RESET inputs of said first and second bistable multivibrator;

a first monostable multivibrator having its input connected to the second input terminal of the circuit, for producing a pulse of predetermined width at its output in response to the signal at its input;

a second monostable multivibrator having its input connected to the first input terminal of the circuit, for producing a pulse of predetermined width at its output in response to the signal at its input;

a first INHIBIT gate having its SIGNAL input connected to the output of said first bistable multivibrator and its INHIBIT input connected to the output of said first monostable multivibrator, for passing the level at its SIGNAL input only when the level at its INHIBIT input is low;

a second INHIBIT gate having its SIGNAL input connected to the output of said second bistable multivibrator and its INHIBIT input connected to the output of said second monostable multivibrator, for passing the level at its SIGNAL input only when the level at its INHIBIT input is low;

an amplifier with inverting and noninverting inputs having its inverting input connected to the output of said first INHIBIT gate and its noninverting input connected to the output of said second INHIBIT gate; and a low-pass filter connected between the output of said amplifier and the circuit output.

* * * * *